Figure 1:
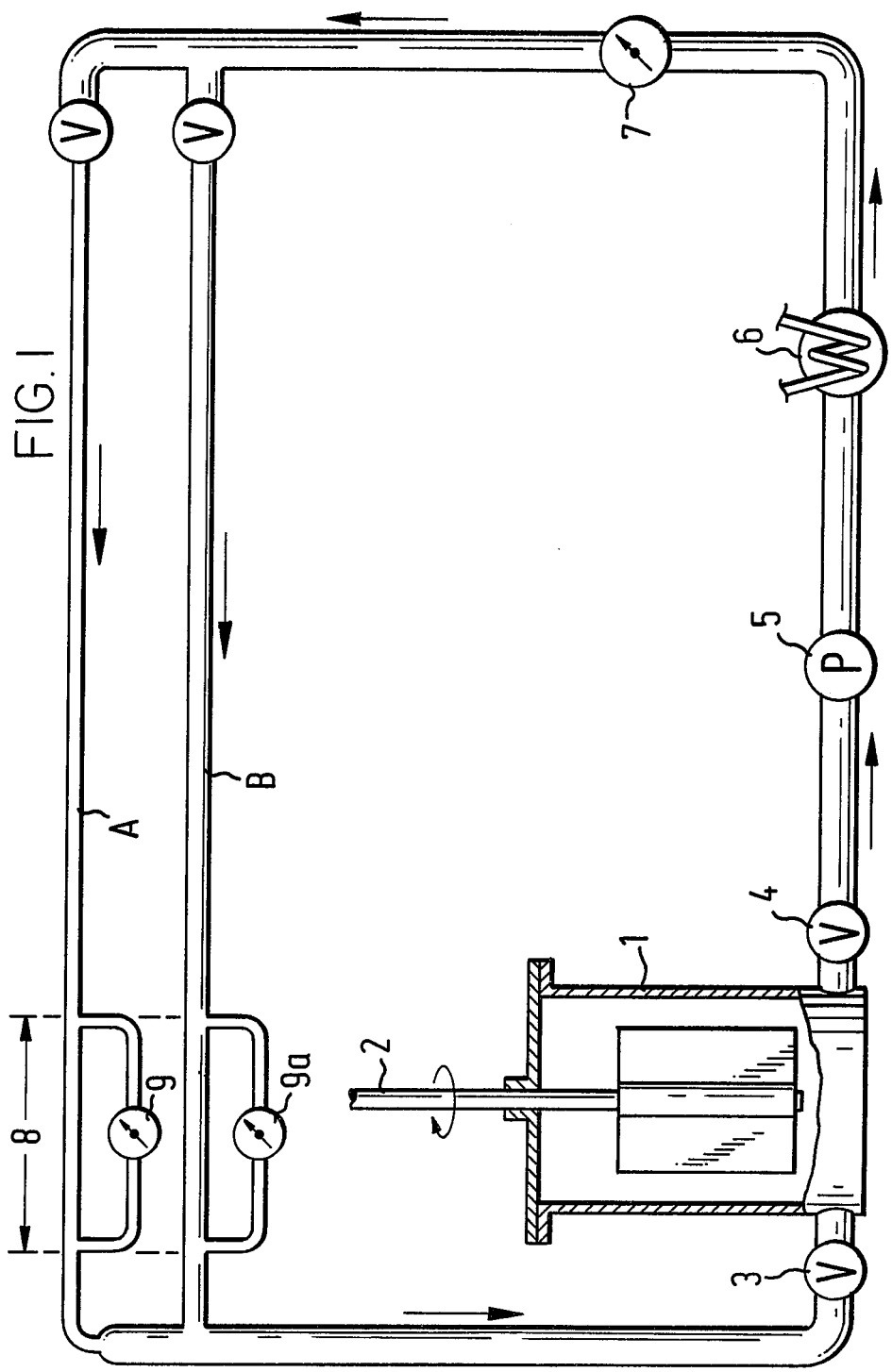

United States Patent [19]

Wilski et al.

[11] 4,407,321
[45] Oct. 4, 1983

[54] DRAG REDUCING AGENTS

[75] Inventors: Hans Wilski, Bad Soden am Taunus; Werner Interthal, Rüsselsheim; Friedrich Engelhardt, Frankfurt am Main, all of Fed. Rep. of Germany

[73] Assignee: Hoechst Aktiengesellschaft, Fed. Rep. of Germany

[21] Appl. No.: 173,638

[22] Filed: Jul. 30, 1980

[30] Foreign Application Priority Data

Aug. 4, 1979 [DE] Fed. Rep. of Germany ....... 2931707

[51] Int. Cl.³ .............................................. F17D 1/16
[52] U.S. Cl. ................................. 137/13; 252/8.55 R
[58] Field of Search ......... 252/8.5 C, 8.55 R, 8.55 D, 252/313 R; 137/13

[56] References Cited

U.S. PATENT DOCUMENTS

| | | | |
|---|---|---|---|
| 3,254,719 | 6/1966 | Root | 252/8.5 C |
| 3,679,000 | 7/1972 | Kaufman | 252/8.55 X |
| 3,768,565 | 10/1973 | Persinski et al. | 137/13 X |
| 3,779,917 | 12/1973 | Norton et al. | 166/275 X |
| 4,263,927 | 4/1981 | Wilski et al. | 137/13 |

Primary Examiner—Herbert B. Guynn
Attorney, Agent, or Firm—Connolly and Hutz

[57] ABSTRACT

Process for reducing the friction pressure drop of aqueous liquids and suspensions in turbulent or pulsating flow by adding from 1 to 1,000 ppm of linear random copolymers of the following formula I as drag reducing agents

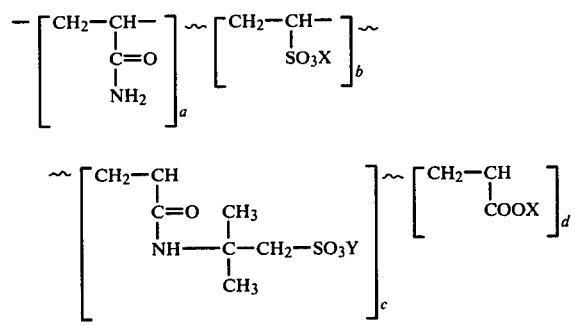

in which X is a $Na^+$, $K^+$ or $NH_4^+$ cation and Y is hydrogen or a $Na^+$, $K^+$ or $NH_4^+$ cation, and in which a, b, c and d represent the proportional weight ratios of the comonomers in % and a is in the range of from 30 to 98, b from 0 to 20, c from 0 to 25 and d from 0 to 45, however, wherein the sum of the portions of b and c must be at least 2, the said copolymers being obtained in the manufacturing process in the form of aqueous and dimensionally stable jellies capable of being cut, while retaining their solubility in water.

4 Claims, 5 Drawing Figures

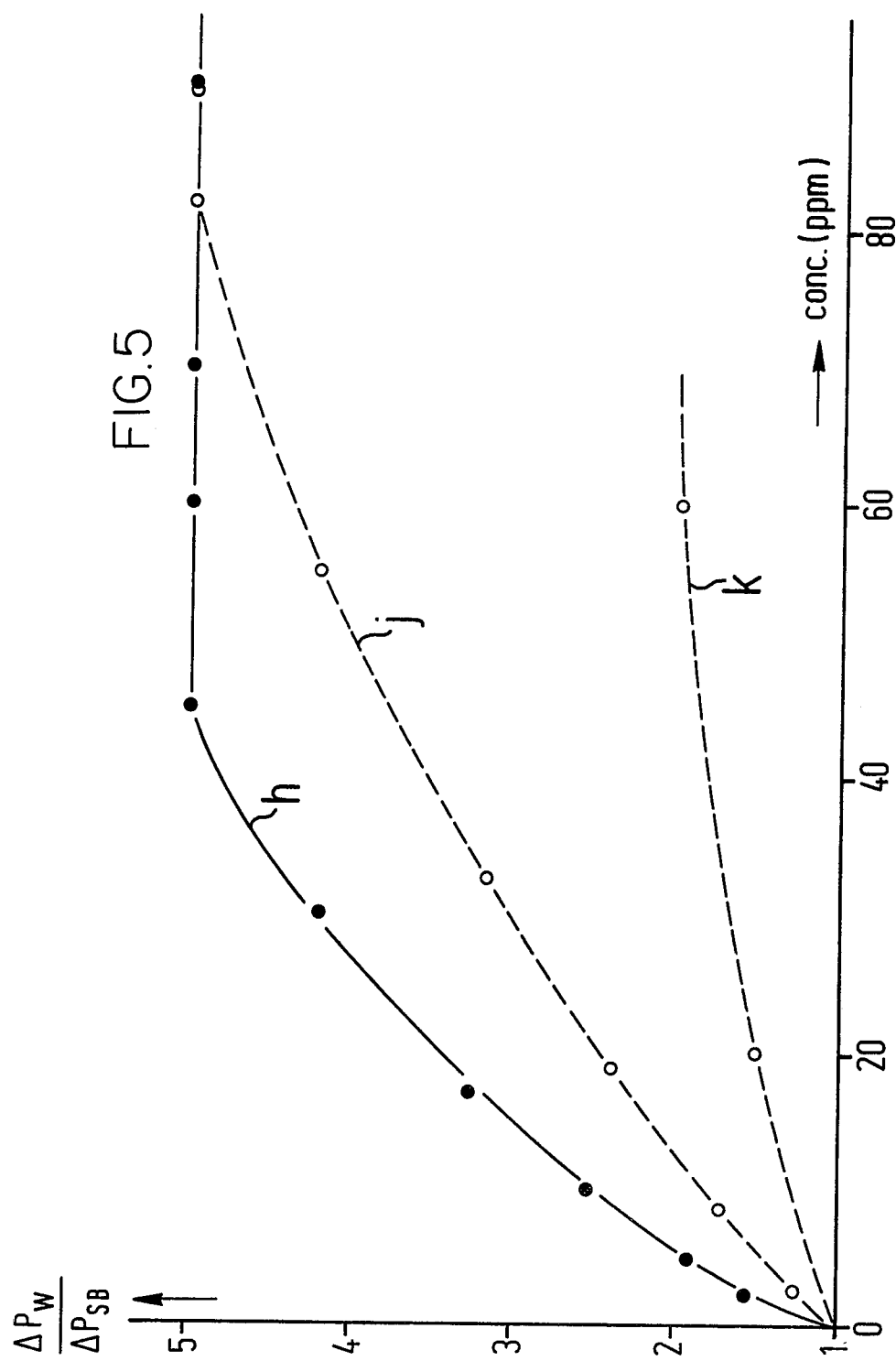

DRAG REDUCING AGENTS

It is generally known that liquids with turbulent flow are subject to frictional drag along the limiting walls. It is also known that this frictional drag can be reduced by adding small amounts of certain substances. In the English language substances reducing the frictional drag are named "drag reducing agents" while in the German language substances of this type are designated "Strömungsbeschleuniger" (cf. E. Dschagarowa and G. Mennig, Rheologica Acta 14, 1089 (1975) and the literature cited therein). A drag reducing agent is thus a substance that accelerates the flow when added in a small amount to a liquid with turbulent or pulsating flow, with otherwise identical conditions. Drag reducing agents make it possible to convey with a given pump a larger amount of liquid through a given pipe.

In many cases this fact alone constituted an industrial profit, for example, when normally a pipe is operated with full rate of utilization and at certain times a peak consumption is to be conveyed. In view of the fact that with a given pump capacity a larger amount of liquid can be conveyed with the use of a drag reducing agent (in the following designated by the abbreviation DRA), the saving of energy resulting therefrom also means a technical advantage in many cases. Finally, in a case where the throughput shall not be increased, the pressure loss can be reduced or pipes of smaller diameter can be used when DRAs are added. By these measures the economy of operation of a pipe can be improved.

Various compounds have been proposed as DRAs. In this connection there is mentioned a series of high molecular weight compounds, for example polyisobutylene (A. Ram, E. Finkelstein and C. Elata, I & EC Process Design and Development 6, No. 3, 309 (1967)) or various polyacrylates and polystyrene derivatives (DE-AS No. 2,056,700), which are added to liquid hydrocarbons as DRAs. As DRA for water, for example polyethylene oxide has been described in literature and also polyacryl amides (BHRA Fluid Engineering ISBNO 900 983 71 x 1977, pages B3-37 to 3-50 and Journal of Applied Polymer Science, volume 18 (1974), pages 3403 to 3421). The use of polyacryl amides to prevent aqueous suspensions from separating and depositing (solids/water mixtures) has been described in U.S. Pat. No. 3,524,682.

Experiments to use the aforesaid compound as well as other compounds described in the relevant literature as DRAs on an industrial scale for aqueous liquids or suspensions revealed that all these compounds have serious drawbacks. To begin with, all liquids that are insoluble or insufficiently soluble in water are unsuitable for aqueous liquids, such as polyisobutylene. Polyethylene oxide mentioned above, which, per se, has a good flow accelerating effect, is rapidly decomposed and rendered inefficient in turbulent flow, especially with high shearing gradients (for example in pumps and nozzles). Hence, this polymer is unsuitable for prolonged use or with high shearing gradients. The polyacryl amides described so far and prepared according to conventional chemical methods are likewise good DRAs, but their efficiency and stability to shearing leave much to be desired as shown in detail in the following examples. It has already been known since 1954 that acrylamide may also be polymerized by radiation induction (cf. Schulz, Renner, Henglein, Kern; Macromol. Chem. 12 (1954) 20). In recent years it has been shown that these polyacryl amides obtained by radiation polymerization are also suitable as DRAs (German Offenlegungsschrift No. 2,749,302). However, the effect as DRAs of the products known by this publication is inferior to that of the copolymers to be used as DRAs according to the invention, which is shown by Example 18 below.

Surprisingly, it has now been found that unlike the known and optionally partially saponified polyacryl amides, very definite, selected copolymers of acrylamide containing sulfonic acid groups exhibit special advantages when used as DRAs in aqueous media. These copolymers containing sulfonic acid groups are obtained in their manufacturing process, without having lost their solubility in water, in the form of an aqueous, dimensionally stable jelly capable of being cut. It has been found that products of this type are distinctly superior in their effect and their shearing stability to all DRAs hitherto known. In particular, the DRAs of the invention show an excellent effect also in the strongly acid and strongly basic pH range, whereas the effect of the conventional DRAs is drastically reduced under these conditions. The fact that these copolymers are obtained in their manufacturing process in the form of a jelly is an essential feature of these products as to their suitability as DRAs. The expression "jelly" in the sense of the present invention is intended to mean a rubber-like mass which is generally transparent and does not change its shape when lying at 20° C. on a flat surface. In other words, the jelly does not diverge like a highly viscous solution. In contradistinction to a highly viscous solution, the jelly can be cut with a knife and its properties resemble those of a rubber.

It is, therefore, the object of the present invention to provide a process for reducing the friction pressure drop of aqueous liquids and suspensions in turbulent or pulsating flow by adding from 1 to 1,000 ppm of a copolymer as DRA which comprises using as DRA a copolymer of acrylamide containing sulfonic acid groups obtained in its manufacturing process in the form of an aqueous, dimensionally stable jelly which has retained its solubility in water and is capable of being cut. The copolymers of acrylamide to be used as DRAs according to the invention are linear random copolymers of formula I $$\left[\begin{array}{c}CH_2-CH-\\|\\C=O\\|\\NH_2\end{array}\right]_a \sim \left[\begin{array}{c}CH_2-CH-\\|\\SO_3X\end{array}\right]_b \sim$$

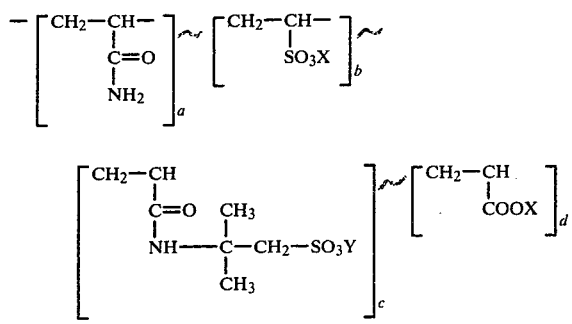

in which X is a $Na^+$, $K^+$ or $NH_4^+$ cation and Y is hydrogen or a $Na^+$, $K^+$ or $NH_4^+$ cation, and in which a, b, c and d represent the proportional weight ratios of the comonomers in % and a is in the range of from 30 to 98, b from 0 to 20, c from 0 to 25 and d from 0 to 45, however, wherein the sum of the portions of b and c must be at least 2, the said copolymers being present in the form of aqueous and dimensionally stable jellies capable of being cut. Thus, the compounds concerned are copolymers of acrylamide and at least one of the comonomers vinylsulfonic acid and acrylamido-2-methyl-propanesulfonic acid as well as optionally acrylic acid. The portion of acrylic acid or acrylate in the copolymer expressed by index d in formula I may be formed either by the use of acrylic acid as comonomer or by the partial saponification of the acid amide groups of the acrylamide during polymerization.

In accordance with the invention it is preferred to use as DRAs those acrylamide copolymers containing sulfonic acid groups obtained in the manufacturing process in the form of a jelly which, when spread on a steel plate with a layer thickness of 1 cm, has an elastic resilience of over 5%, preferably 25 to 45%, in the falling ball test with a steel ball having a diameter of 5 mm.

The copolymers to be used according to the invention and obtained in the form of a jelly are produced by known polymerization processes. In general, the desired products are manufactured by polymerizing an about 15 to 40% by weight, preferably 20 to 30% by weight, aqueous solution of the monomers with the addition of suitable radical forming substances and optionally, for making partially saponified products, with the addition of alkalis. The polymerization is carried out without stirring at an initial temperature of from about 10° to 30° C. During the course of polymerization the temperature in the reaction mixture increases to about 60° to about 95° C. When the reaction is complete, a dimensionally stable jelly is obtained which, for use as DRA, is dissolved in water, suitably after comminution. Radical-forming catalysts suitable for the manufacture of the polymers to be used according to the invention are above all per-compounds which decompose into radicals under the reaction conditions and thus initiate polymerization. Per-compounds of this type are, for example, peroxides such as hydrogen peroxide, dibenzoyl peroxide, tert.butyl hydroperoxide, cumene hydroperoxide and methyl ethyl ketone peroxide. Peroxidisulfates, for example potassium, sodium and ammonium peroxidisulfate, are also suitable. Especially suitable catalysts are redox systems, for example peroxidisulfate/pyrosulfate, peroxidisulfate/formaldehyde sulfoxylate and persulfate/sulfinic acids. The polymers to be used according to the invention are preferably produced with initiator systems as described in DE-OS No. 2,128,009.

By adding alkalis, for example sodium or potassium hydroxide, sodium or potassium carbonate and/or by operating under elevated pressure the acid amide groups are partially saponified in the polymerization to carboxylic acid groups. The desired degree of saponification of the acid amide groups can be regulated above all by the amount of alkali added. In the most simple case, the acid amide groups are saponified with an approximately stoichiometric amount of alkali added. For use as drag reducing agents partially saponified products or the copolymers prepared while using acrylic acid as comonomer are generally preferred. Their degree of saponification is in most cases up to about 45% by weight, preferably 10 to 40% by weight, calculated on the weight of the copolymer.

The polymeric jelly to be used according to the invention can be further characterized in simple manner by its resilience. The resilience is the proportion of recovered to spent work or, in the falling ball test which is very simple to carry out, the proportion of the rebound height of a steel ball to its falling height (cf. K. Memmler, Handbuch der Kautschuk-Wissenschaft, 1930, pages 640 et seq.). It has been ascertained that for use as DRAs those copolymers containing sulfonic acid groups of formula I are suitable which are obtained in their manufacturing process in the form of a jelly which has a resilience of greater than 5% and preferably of from 25 to 45% in the falling ball test. Commercial polyacryl amides or acrylamide copolymers which are generally obtained by polymerization in suspension or in non-aqueous solvents and which are not obtained in the form of a jelly having the characteristic resilience are unsuitable or less suitable as DRAs than the products to be used according to the invention.

Figure 2:
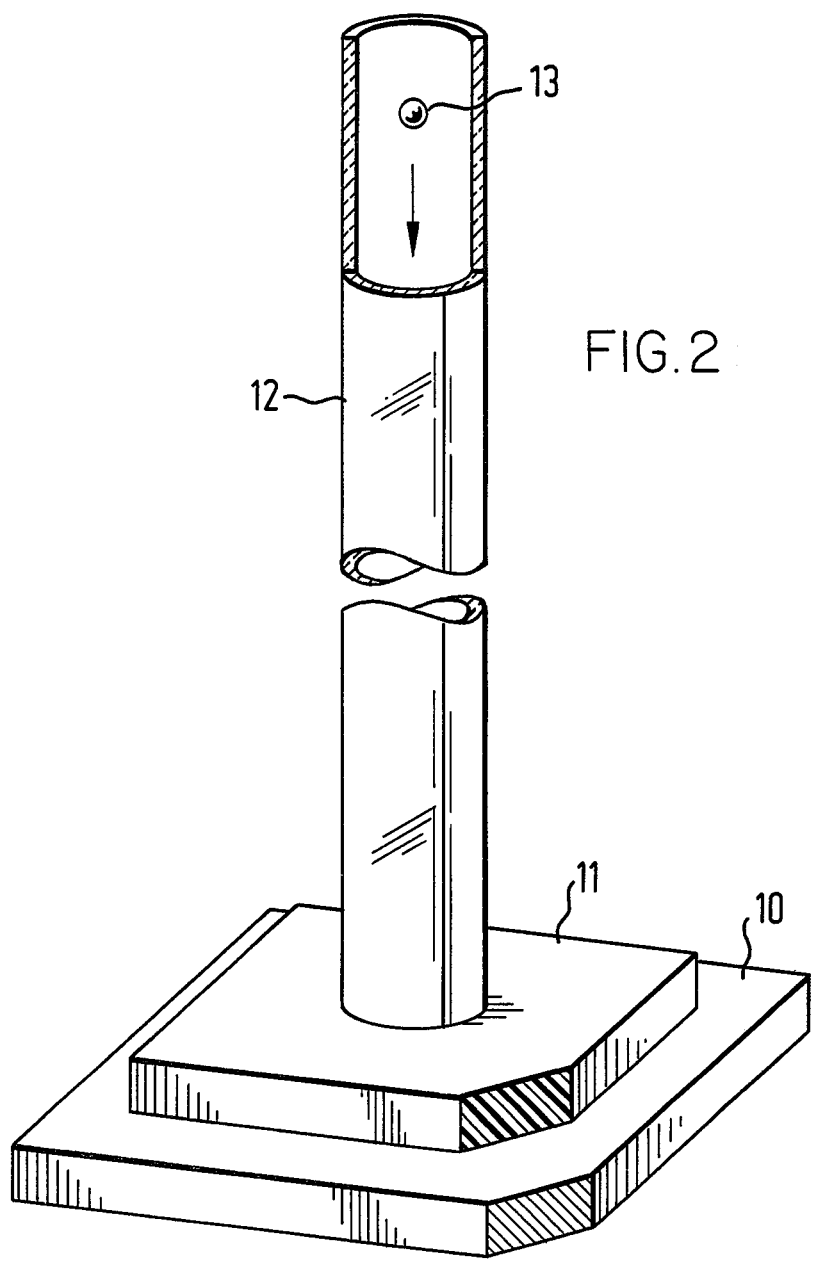

To measure the elastic resilience of the polymeric jelly by the falling ball test the apparatus shown in FIG. 2 is used. A 1 cm thick layer of the polymer to be tested (11) is placed on a 1 cm thick steel plate (10) and powdered with talcum. On the powdered surface a 100 cm long glass tube (12) having a diameter of 2 cm is placed and a steel ball (13) having a diameter of 5 mm is allowed to fall in the tube on the jelly. The resilience R is calculated according to the formula $$R = (H_r/H_f)$$

wherein $H_r$ is the rebound height and $H_f$ is the falling height. In the apparatus used the falling height is equal to 100 cm and therefore the rebound height, measured in centimeters, is equal to the resilience in percent. Copolymers having too low a resilience are little suitable as DRA. It is thus desirable to use copolymers having a relatively high resilience, but values exceeding about 70% are generally difficult to achieve.

For a better handling of the jellies to be used as drag reducing agents, they can be comminuted in suitable devices. The jelly particles obtained in this manner can be directly used for making aqueous solutions of DRAs. To prevent the jelly particles from agglomerating they can also be powdered with a substance with poor wetting properties that is difficultly soluble or insoluble or swells in water, for example corn starch, talcum or magnesium oxide. Alternatively, the jelly obtained by polymerization can be dried and then ground to obtain a powder. The copolymers obtained in this manner either in the form of jelly particles or as a powder can be readily dissolved in water with stirring and the stock solution can then be added to the aqueous medium to reduce the friction pressure drop thereof.

The copolymers containing sulfonic acid groups of formula I to be used as DRAs according to the invention are added to the flowing aqueous liquid in an amount of from about 1 to 1,000 ppm. The concentration of the DRA to be used depends, inter alia and in the first place, on the composition of the flowing aqueous liquid or suspension. In most cases, the DRA is added in an amount of from 10 to 100 ppm. The DRAs to be used according to the invention can be added not only in the form of a concentrated aqueous stock solution, which is preferred, but also in the form of aqueous suspensions or as dry powders.

The aqueous liquids or suspensions to which the DRAs are added are pure water, optionally hot water, aqueous solutions or suspensions of water-insoluble substances or substances that are sparingly soluble in water, for example sand, clay, or ore particles in water or aqueous solutions.

It has been found that a comparative evaluation of the various DRAs on the basis of the data indicated in literature is extremely difficult since the values characteristic for this evaluation, i.e. the drag reducing effect and shearing stability of the tested products substantially depend on the measuring method and the apparatus used for the measurements. Apparatus in which the solutions flow through capillaries (tubes having a diameter of from 0.2 to 2 mm) generally yield especially high values of flow acceleration. Due to the peculiarity of capillary flow these results cannot be transferred without difficulty to an industrial scale and, therefore, they are not taken into consideration. With larger apparatus, too, the measured values cannot be compared directly. This is especially the case with the determination of the shearing stability. An objective, defined technical or physical measure does not yet exist for this value. It is known, however, that in simple tube flows drag reducing agents are decomposed to a relatively small extent only. The principal decomposition takes place in the pumps. Hence, in a flow apparatus in which the liquid containing the DRA is pumped in a cycle, the decomposition is much higher because of the frequent passage through the pump than in a straight pipe. The degree of decomposition of the DRA depends on the construction of the pump. All these facts show that comparative results can only be obtained if the different products to be compared are tested in one apparatus under identical conditions. The flow apparatus used should have a certain minimum size in order that the values obtained could be transferred at least approximately to industrial dimensions. An apparatus of this type is described in the following:

The apparatus used for testing drag reducing agents is shown in FIG. 1. For the test the substance to be tested is dissolved in container (1) using a blade stirrer (2), while valves (3) and (4) remain closed. After dissolution, the two valves are opened and the solution is pumped, by means of pump (5)—in the present case an adjustable mono-pump 2NE80 of Messrs. Netzsch—through heat exchanger (6) and flow meter (7), alternatively through pipe A or pipe B. After an appropriate time of flow the pressure drop is measured over a measuring distance (8) having a length of 1 meter using the differential pressure manometer (9) or (9a). After having passed the measuring distance, the liquid flows back into container (1) and is recycled again.

Pipes A and B have a length of 6 meters, pipe A has an internal diameter of 1.4 cm and pipe B one of 3.0 cm.

The pressure drop in measuring distance (8) is an especially simple measure to evaluate the efficiency of a DRA. In order to become independent of the special dimensions of the apparatus, the relation m of the pressure drop of pure water to that obtained with a solution of a flow accelerator is chosen as measure for the efficiency of a DRA, i.e.

$$m = (\Delta P_W / \Delta P_{DRA})$$

wherein $\Delta P_W$ denotes the pressure drop with pure water and $\Delta P_{DRA}$ denotes the pressure drop with the solution of DRA.

The higher the relation of pressure drop, the better the efficiency of the DRA.

The shearing stability of a DRA, i.e. its resistance against decomposition in high shearing gradients, as they occur especially in pumps, is simply tested by pumping the solution of the DRA through the flow apparatus for a prolonged period of time. The time necessary for reducing the initial relation of the pressure drop to a definite value, for example 50% or 10% of the initial value, is a direct (relative) measure for the shearing stability.

The following examples illustrate the invention.

EXAMPLE 1

A reaction vessel lined with polyethylene was charged with 750 cc of fully desalted water and, while stirring, 247.5 g of acrylamide, 66.6 g of potassium carbonate, 10 g of 25% sodium vinylsulfonate, 0.5 g of dibutyl amine hydrochloride, 0.25 g of ammonium peroxidisulfate and 0.25 g of a compound of the formula

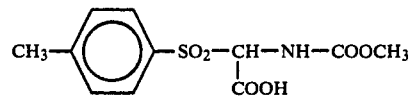

were dissolved therein. After removal of atmospheric oxygen by introducing nitrogen, the reaction mixture polymerized. With an initial temperature of 20° C., the temperature rose to 80° to 85° C. during the course of one hour. The polymerization mixture was not mixed mechanically. The copolymer obtained represented a dimensionally stable, rubber-elastic jelly capable of being cut. It had a resilience of 35%, measured as described above, and the degree of saponification, determined by titration of the carboxyl groups, was found to be 27% by weight (calculated on the weight of the copolymer). The jelly (copolymer I) dissolved in water without residue.

Figure 3:
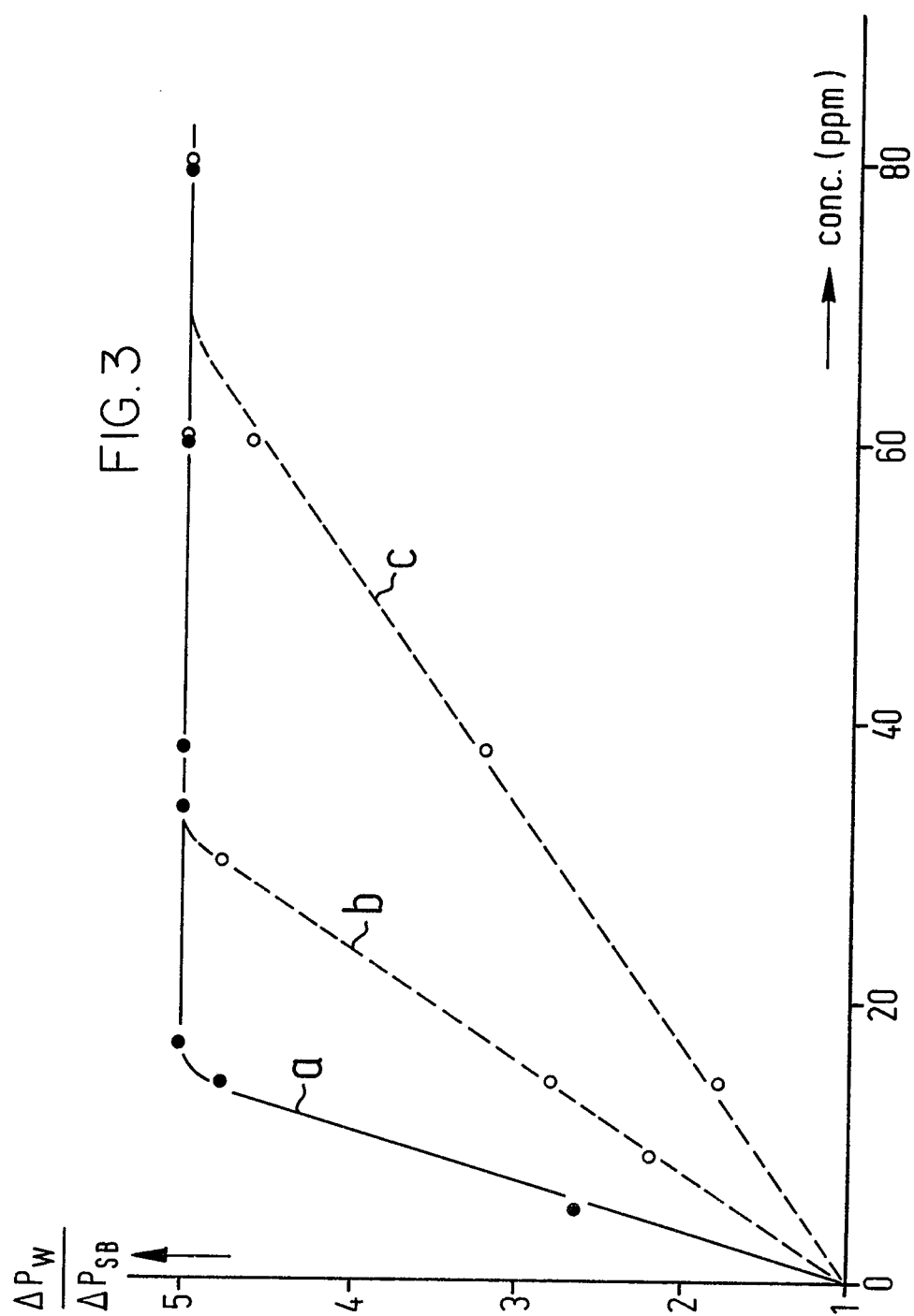

The drag reducing effect of the jelly, measured in the apparatus described above and expressed by the relation of the pressure loss as defined above is plotted in FIG. 3 as curve a in dependence on the concentration. The measured values were obtained directly after having started the experiment in tube A (diameter 1.4 cm) and with a Reynold's number Re of 100,000, at the moment $t=o$ at which a decomposition had not yet taken place. The effect increased with a rising concentration of the DRAs from 0 to 17 ppm (=gram of DRA per cubic meter of water). With a concentration exceeding 17 ppm a further improvement could not be observed. The final value with 17 ppm is m=5, i.e. the pressure loss with DRA is 1/5 only of the pressure loss of pure water.

For comparison, there is plotted in FIG. 3 as curve b the effect of a polyacryl amide (product A) known to be a good DRA and commercially available by the name of "Separan AP 273" (cf. BHRA Fluid Engineering ISBNO 900983 71X 1977, pages B3-37 to B3-50, especially page B3-39, paragraph 5). This anionic polyacryl amide available in powder form, produced by polymerization in a dilute solution, reached its full effect at a concentration of 34 ppm only. Thus, only half the amount of the copolymer I to be used according to the invention was necessary to obtain the same effect.

Curve c in FIG. 3 illustrates the effect of another polyacryl amide obtainable on the market by the name of "Bozefloc A 41" (product B) (cf. Instruction Sheet A No. 8601-Bozefloc- of Benckiser Knapsack GmbH, Ladenburg, Federal Republic of Germany), which product had a still poorer effect.

Figure 4:
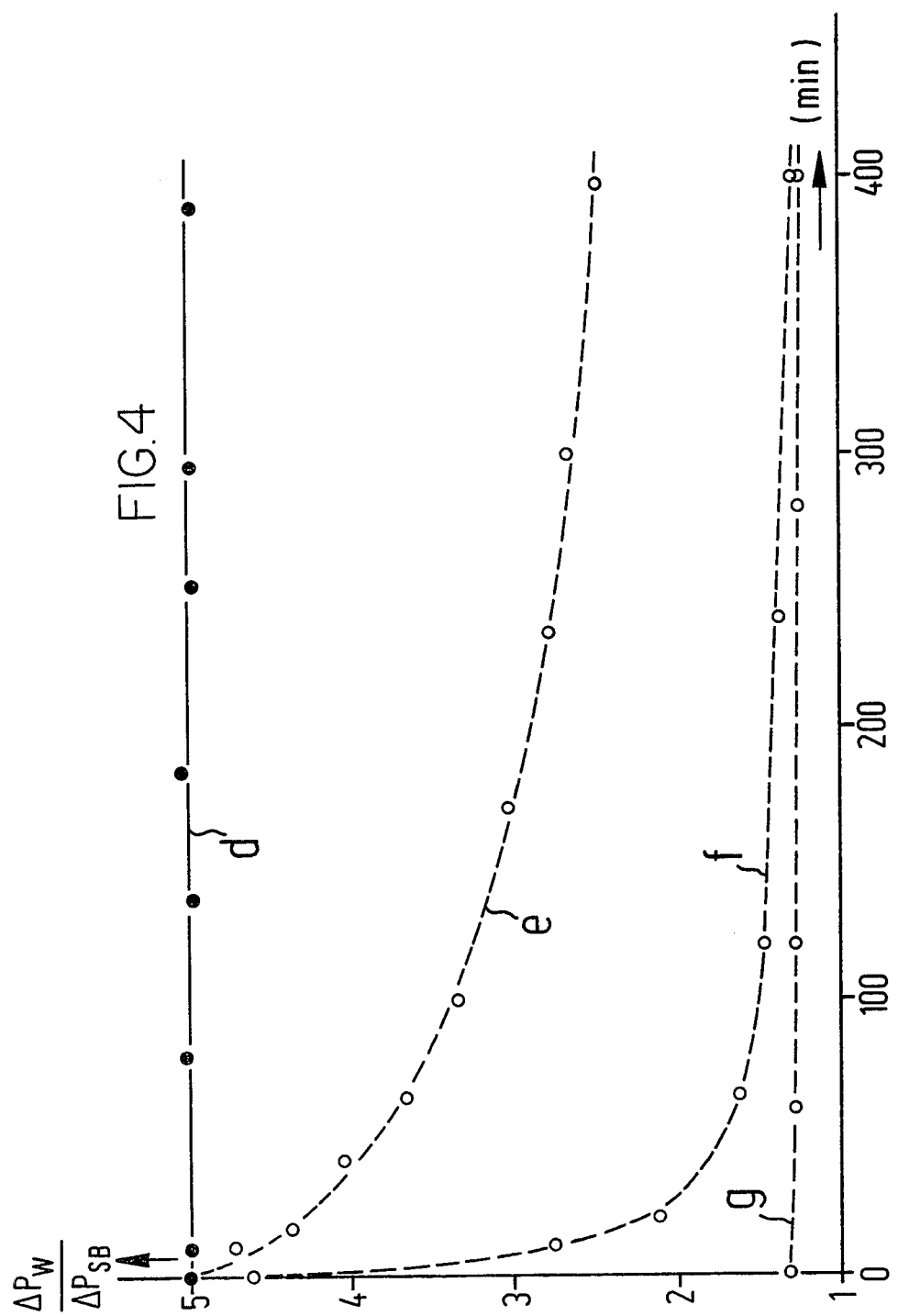

The low concentration to be used of the copolymers according to the invention is not their sole advantage. Surprisingly, the products are characterized by a shearing stability that has not yet been reached. FIG. 4 illustrates the results of a decomposition test in which aqueous solutions of a concentration of 60 ppm were circulated by pumping in the apparatus described above for a prolonged period of time. The concentration of 60 ppm was chosen since this is the concentration at which the DRAs used for comparison display their maximum effect. The experiment was carried out with pipe A (diameter 1.4 cm) and a Reynold's number Re of 100,000. After a pumping time of 400 minutes, the effect of copolymer I used according to the invention was still completely unaltered (curve d), while other polymers used for comparison were substantially decomposed (curve e=product A; curve f=polyethylene oxide (product C) according to the Journal of Applied Polymer Science, volume 18 (1974), pages 3403 to 3421, especially page 3406 last paragraph and page 3408, Table 1). The following table illustrates once more the results obtained.

TABLE 1

| Polymer dissolved in water to a concentration of 60 ppm | $\Delta P_W/\Delta P_{DRA}$ | |
|---|---|---|
| | beginning of experiment | after 400 minutes |
| Copolymer I produced as a jelly | 5.0 | 5.0 |
| commercial polyacryl amide (product A) | 5.0 | 2.3 |
| commercial polyethylene oxide (product C) | 4.4 | 1.2 |

It should be mentioned that there exists a series of drag reducing agents having a very weak effect but a relatively good shearing stability. This relatively good shearing stability is, however, of no technical advantage because of the low absolute values of the drag reduction to be reached. As a typical example therefor, the behavior of a carboxymethyl cellulose (product D) is plotted in FIG. 4 as curve g. In the form of a 2% aqueous solution the carboxymethyl cellulose used had a viscosity of 3,000 Pa.s, measured in a falling ball viscosimeter according to Höppler.

In this case m was 1.25 at the beginning of the experiment and 1.14 after 400 minutes. It should be noted that the value m=1 means complete inefficiency. Drag reducing agents having a good effect (for example m=5) and simultaneously a good shearing stability have not yet been described.

EXAMPLE 2

The copolymer I prepared as described in Example 1 and products A and C were tested in the flow apparatus as described above with the exception that the measured values with pipe A with a Reynold's number of 100,000 were recorded only after a period of pumping of 30 minutes. Within this period, products A and C had been decomposed to a certain extent. After said period, copolymer I according to the invention (curve h in FIG. 5) still had its full effect with a concentration of 40 ppm ($\Delta P_W/\Delta P_{DRA}=5$) while the commercial polyacryl amide (product A) exhibited the same effect at a concentration of 80 ppm only (curve j). Even when used in a concentration of 100 ppm, polyethylene oxide (product C) hardly reached a value $\Delta P_W/\Delta P_{DRA}$ of 2.5 (curve k).

EXAMPLES 3 TO 17

The copolymers tested as DRAs in these Examples were prepared in a manner analogous to that of Example 1. The composition of the copolymers may be seen from the following Table 2.

In said Table, the symbols have the meanings specified below:
AAM—acrylamide
NaVSA—sodium salt of vinylsulfonic acid
AMPS—acrylamido-2-methylpropanesulfonic acid
X—cation of acrylate or of acrylic acid
Y—cation of AMPS The drag reducing effect of the products measured in the above-described apparatus is expressed in the last column of Table 2 by the cited pressure ratio $\Delta P_W/\Delta P_{DRA}=m$. The measuring was carried out with pipe A (diameter 1.4 cm) and a Reynold's number Re of 100,000 and a concentration of the copolymers of 17 ppm in water immediately on switching on the apparatus.

TABLE 2

| Example No. | AAM (% by weight) | X-acrylate (% by weight) | X | NaVSA (% by weight) | AMPS (% by weight) | Y | m |
|---|---|---|---|---|---|---|---|
| 3 | 73 | 25 | Na | 2 | — | | 5.0 |
| 4 | 73 | 25 | K | 2 | — | | 5.0 |
| 5 | 83 | 12 | K | 5 | — | | 5.0 |
| 6 | 70 | 25 | Na | 5 | — | | 5.0 |
| 7 | 60 | 25 | K | 15 | — | | 4.0 |
| 8 | 90 | — | | 10 | — | | 4.5 |
| 9 | 95 | — | | — | 5 | H | 5.0 |
| 10 | 90 | 5 | K | — | 5 | K | 5.0 |
| 11 | 90 | — | | — | 10 | Na | 5.0 |
| 12 | 90 | — | | — | 10 | NH4 | 5.0 |
| 13 | 80 | — | | — | 20 | Na | 4.0 |
| 14 | 75 | 5 | K | — | 20 | K | 4.0 |
| 15 | 48 | 45 | K | 2 | — | | 5.0 |
| 16 | 60 | — | | 20 | 20 | NH4 | 3.8 |
| 17 | 60 | 30 | Na | 5 | 5 | Na | 5.0 |

EXAMPLE 18

The drag reducing agents according to the invention were compared with two polyacryl amides prepared by radiation polymerization which are recommended in German Offenlegungsschrift No. 2,749,302 as particularly suitable drag reducing agents. One of these products prepared by radiation polymerization, which has been described in Table I, page 19 of German Offenlegungsschrift No. 2,749,302 as "polymer B" is labelled "product D" in the following; the second compound, which is labelled "product E" in the following, is characterized in Example 3 on page 22 of German Offenlegungsschrift No. 2,749,302 in Test 5. All products were tested at a concentration of 17 ppm in water in the above-described flow apparatus with pipe A (diameter 1.4 cm) and a Reynold's number of 100,000. The measuring was carried out immediately on switching on the apparatus. The results obtained in the tests which have been summarized in the following Table 3 show the clearly superior properties of the DRAs according to the invention.

TABLE 3

| Product | m |
|---|---|
| Copolymer according to Example 3 | 5.0 |
| Copolymer according to Example 17 | 5.0 |
| Product B (comparative product prepared by radiation polymerization) | 3.1 |
| Product E (comparative product prepared by radiation polymerization | 2.7 |

We claim:
1. Process for reducing the friction pressure drop of aqueous liquids and suspensions in turbulent or pulsat- ing flow by adding from 1 to 1,000 ppm of a drag reducing agent, which comprises using as the drag reducing agent a linear random copolymer of the following formula I

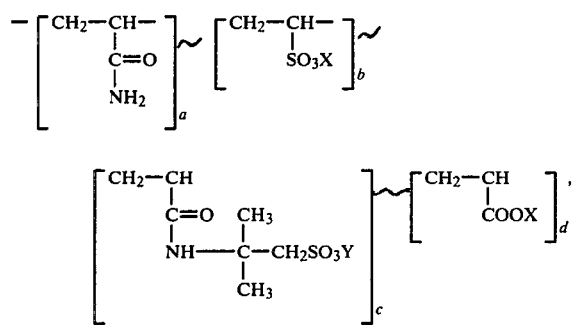

in which X is in a $Na^+$, $K^+$ or $NH_4^+$ cation and Y is hydrogen or $Na^+$, $K^+$ or $NH_4^+$ cation, and in which a, b, c and d represent the proportional weight ratios of the comonomers in % and a is in the range of from 30 to 98, b from 0 to 20, c from 0 to 25 and d from 0 to 45, however, wherein the sum of the portions of b and c must be at least 2, the said copolymer being obtained by a polymerization reaction without stirring in an about 15 to 40% by weight aqueous solution, the reaction being started at an initial temperature of about 10° to 30° C. and completing the reaction at about 60° to 95° C. resulting in a polymer in the form of an aqueous, dimensionally stable jelly which has retained a solubility in water and is capable of being cut and which has an elastic resilience of more than 5%.

2. Process as claimed in claim 1, which comprises using as the drag reducing agent a copolymer of formula I of acrylamide and at least one of the comonomers vinylsulfonic acid and acrylamido-2-methyl-propanesulfonic acid, wherein part of the acrylamide may be saponified up to a saponification degree of 45% by weight, calculated on the weight of the copolymer.

3. Process as claimed in claim 1, which comprises using as the drag reducing agent a copolymer of formula 1, which is obtained in the manufacturing process in the form of a jelly which, when spread on a steel plate with a layer thickness of one space e.m., shows an elastic resilience of 25 to 45%.

4. Process as claimed in claim 1, which comprises using as the drag reducing agent a copolymer of formula 1, which is obtained by polymerization of solutions of the monomers in the presence of radical-forming substances.

* * * * *